United States Patent
Kumar et al.

(10) Patent No.: US 10,402,821 B2
(45) Date of Patent: Sep. 3, 2019

(54) REDIRECTING TO A TRUSTED DEVICE FOR SECURED DATA TRANSMISSION

(71) Applicant: eBay Inc., San Jose, CA (US)

(72) Inventors: Sudeep Kumar, Kerala (IN); Deepak Kumar Vasthimal, San Jose, CA (US)

(73) Assignee: eBay Inc., San Jose, CA (US)

( * ) Notice: Subject to any disclaimer, the term of this patent is extended or adjusted under 35 U.S.C. 154(b) by 998 days.

(21) Appl. No.: 14/813,953

(22) Filed: Jul. 30, 2015

(65) Prior Publication Data
US 2017/0032366 A1    Feb. 2, 2017

(51) Int. Cl.
| | |
|---|---|
| G06Q 40/00 | (2012.01) |
| G06Q 20/38 | (2012.01) |
| H04B 1/3827 | (2015.01) |
| H04L 29/06 | (2006.01) |
| H04W 12/06 | (2009.01) |
| G06Q 30/06 | (2012.01) |
| H04L 29/08 | (2006.01) |

(52) U.S. Cl.
CPC ....... *G06Q 20/382* (2013.01); *G06Q 30/0601* (2013.01); *H04B 1/385* (2013.01); *H04L 63/0853* (2013.01); *H04W 12/06* (2013.01); *H04L 67/02* (2013.01)

(58) Field of Classification Search
USPC .......................................................... 726/7
See application file for complete search history.

(56) References Cited

U.S. PATENT DOCUMENTS

| | | |
|---|---|---|
| 5,937,044 A | 8/1999 | Kim |
| 5,982,293 A | 11/1999 | Everett et al. |
| 7,539,746 B2 | 5/2009 | Bankier et al. |
| 8,131,875 B1 | 3/2012 | Chen et al. |
| 8,819,798 B2 | 8/2014 | Zises |
| 9,948,523 B2 * | 4/2018 | Won ................... G06F 3/04817 |
| 2003/0112936 A1 | 6/2003 | Brown et al. |
| 2003/0200182 A1 | 10/2003 | Truitt et al. |
| 2008/0022382 A1 | 1/2008 | Bradbury |

(Continued)

FOREIGN PATENT DOCUMENTS

| | | |
|---|---|---|
| CN | 108141442 | 6/2018 |
| EP | 3329656 | 6/2018 |
| WO | WO-2017019956 A1 | 2/2017 |

OTHER PUBLICATIONS

"International Application Serial No. PCT/US2016/044698, International Search Report dated Oct. 20, 2016", 3 pgs.

(Continued)

*Primary Examiner* — Samica L Norman

(74) *Attorney, Agent, or Firm* — Schwegman Lundberg & Woessner, P.A.

(57) ABSTRACT

In various example embodiments, a machine is configured to redirect completion of a transaction to a trusted device. For example, the machine determines that a page involving the transaction is being displayed in a user interface of a first device. The page may be associated with the product or service. The machine identifies an interruption of the displaying of the page in the user interface of the first device. The machine identifies a second device that is trusted by the user. The machine transmits a communication including a notification to the second device. The notification indicates the transaction.

20 Claims, 10 Drawing Sheets

(56) References Cited

U.S. PATENT DOCUMENTS

| | | |
|---|---|---|
| 2008/0152107 A1 | 6/2008 | Mendiola |
| 2013/0174237 A1* | 7/2013 | Zises ........................ G06F 21/32 |
| | | 726/7 |
| 2014/0046831 A1 | 2/2014 | Sandler |
| 2014/0188668 A1 | 7/2014 | Brabec et al. |
| 2015/0026056 A1 | 1/2015 | Calman et al. |
| 2016/0302065 A1* | 10/2016 | Bansal .................. H04W 12/06 |

OTHER PUBLICATIONS

"International Application Serial No. PCT/US2016/044698, Written Opinion dated Oct. 20, 2016", 7 pgs.
International Preliminary Report on Patentability received for PCT Application No. PCT/US2016/044698, dated Feb. 8, 2018, 8 pages.
"European Application Serial No. 16831408.6, Response filed Mar. 21, 2018 to to Communication pursuant to Rules 161 (2) and 162 EPC dated Mar. 7, 2018", 17 pgs.
Extended European Search Report Received for European Patent Application No. 16831408.6, dated Jan. 8, 2019, 5 pages.

\* cited by examiner

REDIRECTING TO A TRUSTED DEVICE FOR SECURED DATA TRANSMISSION

TECHNICAL FIELD

Embodiments of the present disclosure relate generally to redirecting to a trusted device and, more particularly, but not by way of limitation, to redirecting to a trusted device for secured data transmission.

BACKGROUND

Users may enjoy browsing products and services offered in a networked environment. However, sometime a user may choose to not complete a transaction for a product or service after viewing a description of the product or service. For example, the user may choose to leave a transaction page associated with the product or service because the user does not trust to securely provide data from the device being used to browse the networked environment.

BRIEF DESCRIPTION OF THE DRAWINGS

Various ones of the appended drawings merely illustrate example embodiments of the present disclosure and cannot be considered as limiting its scope.

Figure 1:
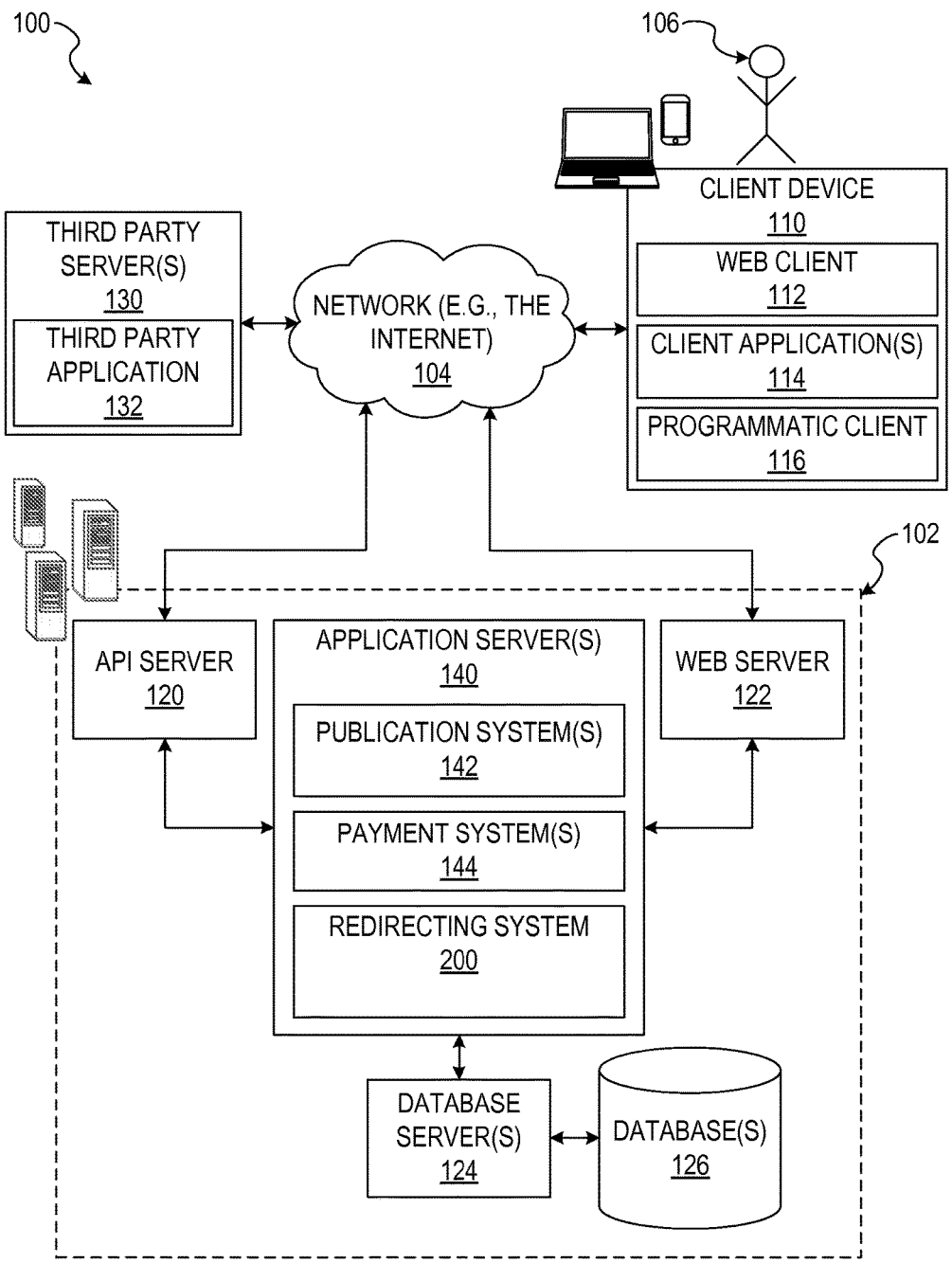
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

While navigating on an online environment, users may browse various websites using multiple devices, such as, for example, mobile phones, tablets, desktops, laptops, and wearable devices. Some of these devices may be private (e.g., belong to a particular user or user's family), while other devices may be public (e.g., library computers). Because users may view certain devices as more secure than others, it is not uncommon for users to prefer to provide personal or confidential data (e.g., data that the user does not want freely accessible by others such as a password, a Personal Identification Number (PIN), or financial information) only with some particular devices. An inference may be made that if a user chooses to provide data from a particular device, the user trusts the particular device for secured data exchange (e.g., a payment). The social behavior of providing data only with certain preferred devices is viewed as having negative implications for some websites as many potential transactions are never completed by the users.

In some embodiments, a user browses websites (e.g., looks for an item online) using a first device, but provides personal or confidential data (e.g., makes a payment for the item) using a second device. For example, the user may, using the first device, first add the searched item to a list (e.g., a wish list, a cart, etc.), and then, using the second device, view the list, select the item, and make a payment for the item from the second device. However, often the user forgets to make a payment for the selected item and, therefore, fails to complete a transaction that the user may have intended. It may be beneficial for the online store to employ a system that reminds the user to finalize the intended transaction. In response to a prompt transmitted by the system to a device trusted by the user, the user may make the payment for the selected item from the trusted device. Accordingly, a redirecting system may facilitate a redirection of a transaction (e.g., a payment) to a device that the user trusts to be used for payments.

In some example embodiments, a user logs in to a web site (e.g., a web site of a publication system). The login information of the user and device-specific details (e.g., IP address, Subscriber Identity Module (SIM) card number, etc.) pertaining to the device used by the user to log in to the web site are collected by the redirecting system. The redirecting system maps these details to a user profile associated with the user and stored in a record of database.

The redirecting system may also collect device-specific data for other devices that the user has used to connect to the web site. The user may be given an option to enter additional information for one or more devices (e.g., a mobile phone number) which the redirecting system collects and associated with the user in an information record. The redirecting system may prompt the user to provide the mobile phone number when the user logs into the web site or, alternatively or additionally, when the user enters profile information at the web site (e.g., when the user opens an account or provides billing or shipping information). Receiving the mobile number helps to provide better notifications through modem-based message services such as but not limited to SMS or MMS.

In some example embodiments, an information record associated with the user includes identifiers of one or more devices used by the user to previously access the web site, and information pertaining to whether particular devices were previously used to complete a transaction (e.g., make payments). For example, the user John Smith may be associated with an information record that includes the following information: mobile 1 identifier (ID) (e.g., SIM card 1 ID), used for payment, date of payment, mobile phone number; mobile 2 ID (e.g., SIM card 2 ID); desktop ID (e.g., IP address), used for payment, date of payment; tablet 1 ID (e.g., SIM card 3 ID), used for payment, date of payment, tablet ID. This information can be collected through user agent information that is sent by device and is accessible via web/native application.

In certain example embodiments, the redirecting system provides the user with a page for selecting a device for later notification (e.g., a later payment notification). The device selection page may be a user interface that references one or more devices previously used by the user for payments and that allows the user to select a particular device. Alternatively or additionally, the device selection page may display a user interface field in which the user can enter data identifying a device which the user has not yet used for payment but which is trusted by the user for future payments.

The device selection page may be provided to the user at various times. In some instances, the redirecting system provides the device selection page to the user when the user sets up the user's profile at the web site. Additionally or alternatively, the redirecting system provides the device selection page to the user when the user is leaving a payment page associated with a product or service or when the user logs in again to the web site. For example, the user navigates to the payment page for a product or service using a public computer (e.g., a library computer). The user does not trust the public computer to make a payment for the product or service. Upon the user leaving the web site (e.g., navigating away from the payment page), the redirecting system transmits a notification to the public computer stating "Would you like to complete the transaction (e.g., make the payment) on Mobile 1 or Tablet 1?" The user may select Tablet 1. Based on the user's selection, a communication including the user's selection is transmitted to the redirecting system. The redirecting system sends a further communication that includes a notification (e.g., a reminder to complete the payment for the product or service) to Tablet 1. The notification may include a Uniform Resource Locator (also "URL") for the payment page referencing the product or service.

In some instances, the redirecting system facilitates the completion of the transaction by the user without further authentication of the user. For example, based on a prior authentication of the user (e.g., the user providing correct login information to access the web site), the redirecting system transmits, to a device trusted for payment, the communication that includes the URL to the payment page referencing the product or service previously viewed by the user. Based on a selection (e.g., a click) by the user of the URL, the redirecting system causes a display of the payment page on the device trusted for payment and accepts payment for the product or service without requesting the user to provide authentication data.

In some example embodiments, if the user makes a payment from a particular device that has not been previously used for a payment, the redirecting system updates the information record associated with the user to record that the particular device is trusted by the user for secure data exchange.

With reference to FIG. 1, an example embodiment of a high-level client-server-based network architecture 100 is shown. A networked system 102, in the example forms of a publication system or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, a wearable device, a smart watch, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 is a device of a user that can be used to perform a transaction involving digital items within the networked system 102. In one embodiment, the networked system 102 comprises a network-based marketplace that responds to requests for product listings, publishes publications comprising item listings of products or services available on the network-based marketplace, and manages payments for these marketplace transactions. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system 142 provides a number of publication functions and services to users 106 that access the networked system 102. The payment system 144 likewise provides a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The redirecting system 200 provides functionality operable to perform various operations for redirecting to a trusted device and facilitating the completion of a transaction by a user. For example, the redirecting system 200 accesses the user selected data from the databases 126, the third party servers 130, the publication system 120, and other sources. In some example embodiments, the redirecting system 200 identifies one or more devices trusted by the user for making payments online. In some example embodiments, the redirecting system 200 communicates with the publication systems 120 (e.g., accessing item listings) and payment system 122. In an alternative embodiment, the redirecting system 200 may be a part of the publication system 120 or of the payment system 122.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and redirecting system 200 could also be implemented as standalone software programs, which do not necessarily have networking capabilities.

The web client 112 accesses the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
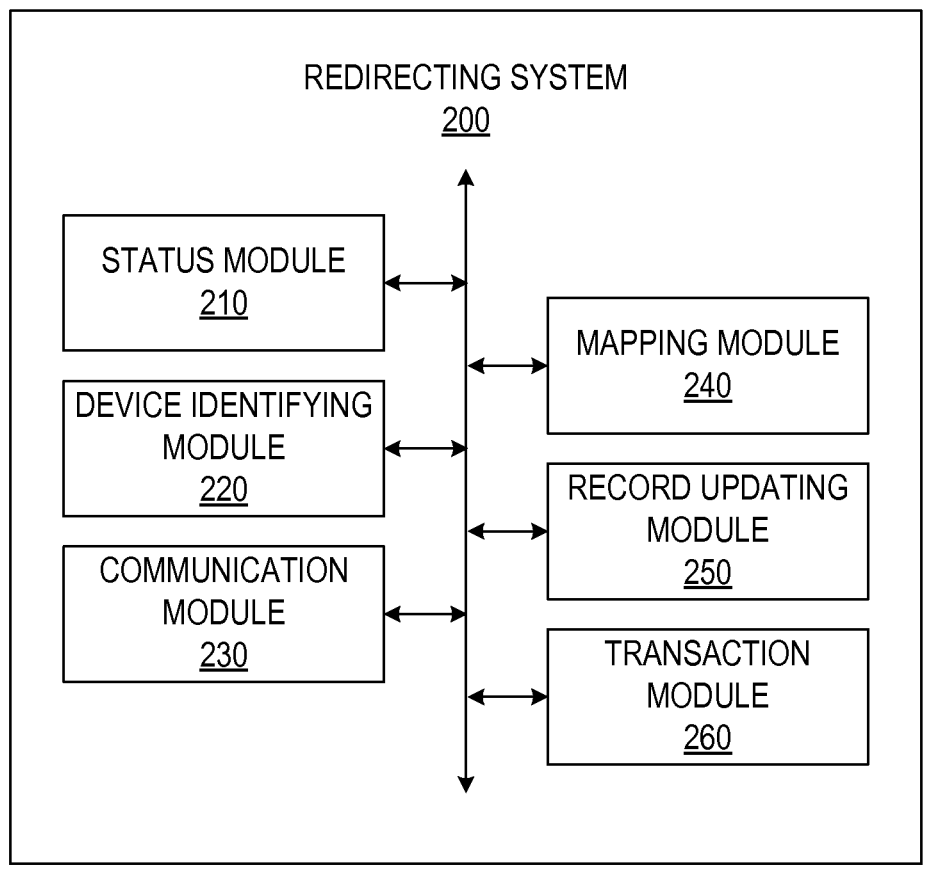
FIG. 2 is a block diagram illustrating components of a redirecting system, according to some example embodiments.

FIG. 2 is a block diagram illustrating components of the redirecting system 200, according to some example embodiments. As shown in FIG. 2, the redirecting system 200 includes a status module 210, a device identifying module 220, a communication module 230, a mapping module 240, a record updating module 250, and a transaction module 260, all configured to communicate with each other (e.g., via a bus, shared memory, or a switch).

According to some example embodiments, the status module 210 determines that a page involving a transaction is being displayed in a user interface of a first device. The page involving the transaction may be a payment page for a purchase of a product or service. The page involving the transaction may be displayed in the user interface of the first device based on a selection by the user of a representation (e.g., an image or a video) of the product or service.

The status module 210 also detects an interruption of the display of the page in the user interface of the first device. The status module 210 may determine that the user has navigated away from the page. When the user navigates away and does not pursue a secure exchange of data (e.g., a payment), such events are identified and captured.

The device identifying module 220 identifies a second device that is trusted by the user. In some example embodiments, the device identifying module 220 determines that the second device has been previously used by the user to make a payment for a previous purchase.

In certain embodiments, the identifying of the second device that is trusted by the user includes accessing profile data provided by the user. The profile data may include identifiers of one or more trusted devices. The identifying of the second device that is trusted by the user may also include selecting the second device for transmittal of a communication including a notification based on a device selection rule. For example, a device selection rule specifies that a particular device is selected based on whether the user chose the particular device for receiving notifications. According to another example, a device selection rule specifies that only a device that has previously been used by the user to make payments may be selected.

The communication module 230 transmits a communication including a notification to the second device. The notification indicates (e.g., references) the transaction. In some instances, the transmitting of the communication including the notification to the second device comprises causing a display of the notification in a user interface of a device associated with the user (e.g., a smart watch associated with the user).

In some embodiments, the communication is a first communication. The communication module 230 may receive a further communication from the first device. The further communication includes login data that identifies the user. The further communication may also include device data that identifies the first device.

In certain embodiments, the communication module 230 transmits a second communication to the first device. The second communication includes a request for the user to identify one or more other devices for receiving notifications. The communication module 230 may receive a third communication from the first device. The third communication is transmitted by the first device in response to the second communication from the first device. The third communication identifies one or more other devices for receiving notifications. For example, the third communication includes one or more references to one or more other devices to receive notifications. In some instances, the one or more other devices are devices that the user trusts for completing a transaction (e.g., providing billing information, shipping information, or other personal or financial information).

In some embodiments, the communication module 230 transmits an alternative second communication to the first device. The alternative second communication includes a request for the user to select, from one or more devices associated with the user, a particular device for transmittal of the notification. The communication module 230 may receive an alternative third communication that includes a selection, by the user, of the second device for the transmittal of the notification. The alternative third communication may be transmitted by the first device in response to the alternative second communication from the first device.

The mapping module 240 associates the first device with the user based on the login data, the device data received from the first device, or both. The mapping is stored as a database record for later use.

The record updating module 250 updates the information associated with the user to indicate that the one or more devices are trusted devices. For example, the record updating module 250 identifies a record associated with payment information for the user and tags (or marks or otherwise identifies) an identifier of a particular device preferred by the user for payments. The record updating module 250 may, upon the device identifying module 220 identifying the second device as trusted for making payments, update a database record that associates the user with one or more devices trusted for payment to include the second device.

The transaction module 260 facilitates the completion of a transaction by the user. In some example embodiments, the transaction module 260 facilitates a payment by the user for the product or service from the second device without additional authentication of the user.

To perform one or more of its functionalities, the redirecting system 200 communicates with one or more other systems. For example, an integration engine (not shown) may integrate the redirecting system 200 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources to allow information to be passed between the applications and to allow the applications to share and access common data. Furthermore, the modules may access one or more of the databases 126.

Figure 3:
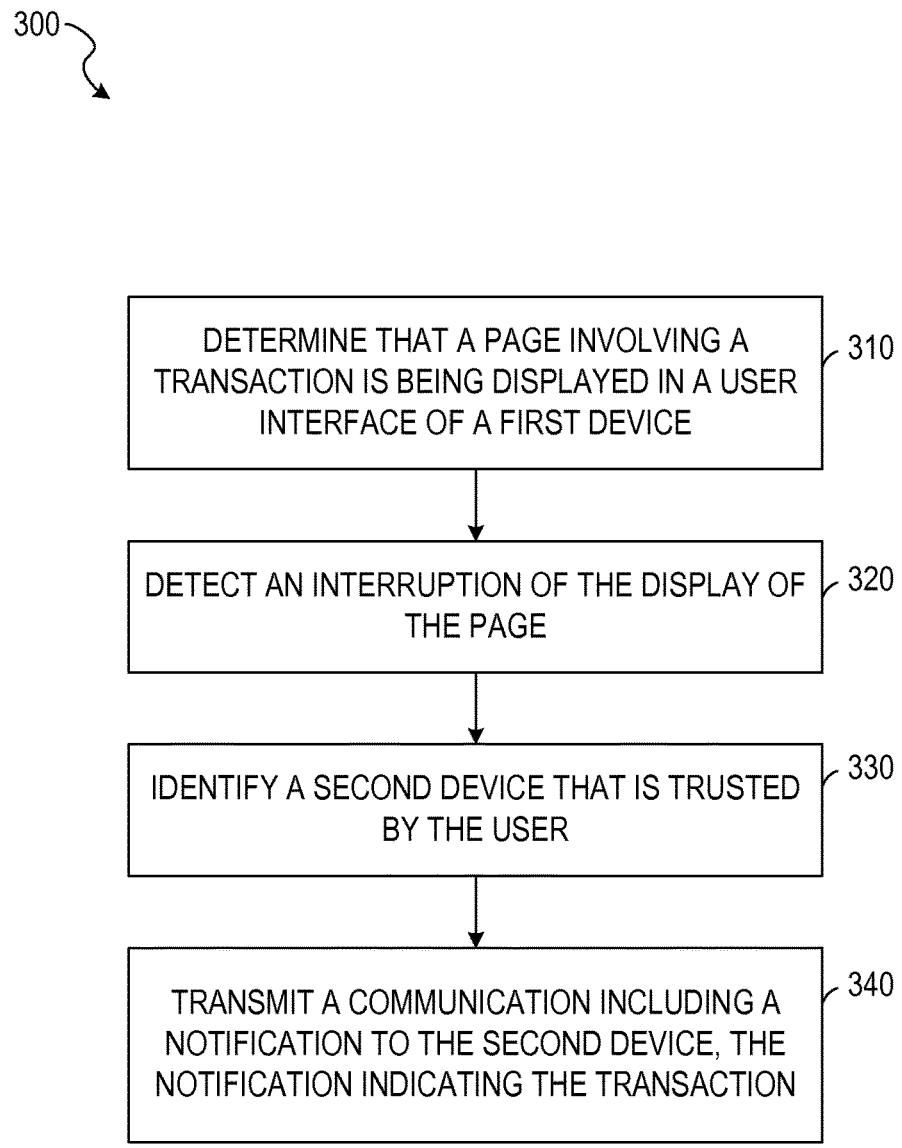
FIG. 3 is a flow diagram illustrating a method for redirecting to a trusted device for secured data transmission, according to some example embodiments.

FIGS. 3-7 are flowcharts illustrating a method for redirecting to a trusted device, according to some example embodiments. Operations in the method 300 illustrated in FIG. 3 may be performed using modules described above with respect to FIG. 2. As shown in FIG. 3, method 300 may include one or more of method operations 310, 320, 330, and 340, according to example embodiments.

At operation 310, the status module 210 determines that a page involving a transaction is being displayed in a user interface of a first device. The page involving the transaction may be displayed in the user interface of the first device based on a selection by the user of a representation (e.g., a photograph, an image, a video, etc.) of a product or service.

At operation 320, the status module 210 detects an interruption of the displaying of the payment page in the user interface of the first device.

At operation 330, the device identifying module 220 identifies a second device that is trusted by the user. In some embodiments, the device identifying module 220 identifies one or more devices that the user previously used to make payments for previous purchases, and selects the second device from the one or more devices previously used by the user to make payments for previous purchases. The selecting of the second device may be based on a device selection rule. For example, a device selection rule specifies that a particular device is selected based on whether the user chose the particular device for receiving notifications. According to another example, a device selection rule specifies that only a device that has previously been used by the user to make payments may be selected.

In certain embodiments, the identifying of the second device that is trusted by the user includes accessing profile data provided by the user. The profile data includes identifiers of one or more trusted devices. The identifying of the second device that is trusted by the user also includes selecting the second device for transmittal of the communication including the notification based on a device selection rule.

At operation 340, the communication module 230 transmits a communication including a notification to the second device. In some embodiments, the transmitting of the communication including the notification to the second device comprises causing a display of the notification in a user interface of the second device (e.g., a smart watch) associated with the user. Further details with respect to the method operations of the method 300 are described below with respect to FIGS. 4-7.

Figure 4:
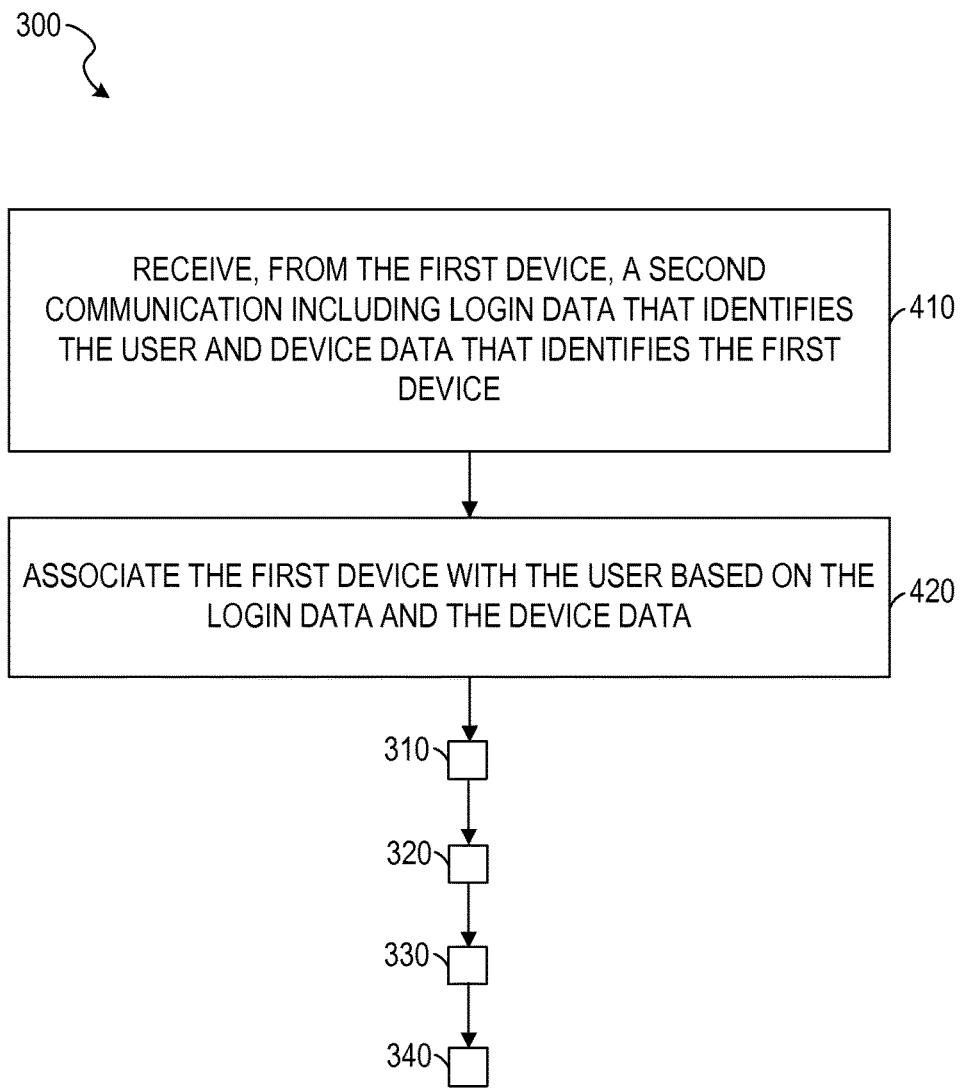
FIG. 4 is a flow diagram illustrating a method for redirecting to a trusted device for secured data transmission, and representing additional steps of the method illustrated in FIG. 3, according to some example embodiments.

As shown in FIG. 4, method 300 includes operations 410 and 420, according to some embodiments. Operation 410 is performed before operation 310, in which the status module 210 determines that a payment page for a purchase of a product or service is being displayed in a user interface of a first device.

In some instances, the communication transmitted by the communication module 230 to the first device is a first communication. At operation 410, the communication module 230 receives a second communication from the first device. The second communication is received in response to the first communication. The second communication may include login data that identifies the user and device data that identifies the first device.

Operation 420 is performed after operation 410. At operation 520, the mapping module 240 associates the first device with the user based on the login data and the device data. The mapping module 240 may generate a record in a database to record the association between the user and the first device. Similarly, additional associations may be created between the user and other devices used by the user to log into a web site displaying the product or service.

Figure 5:
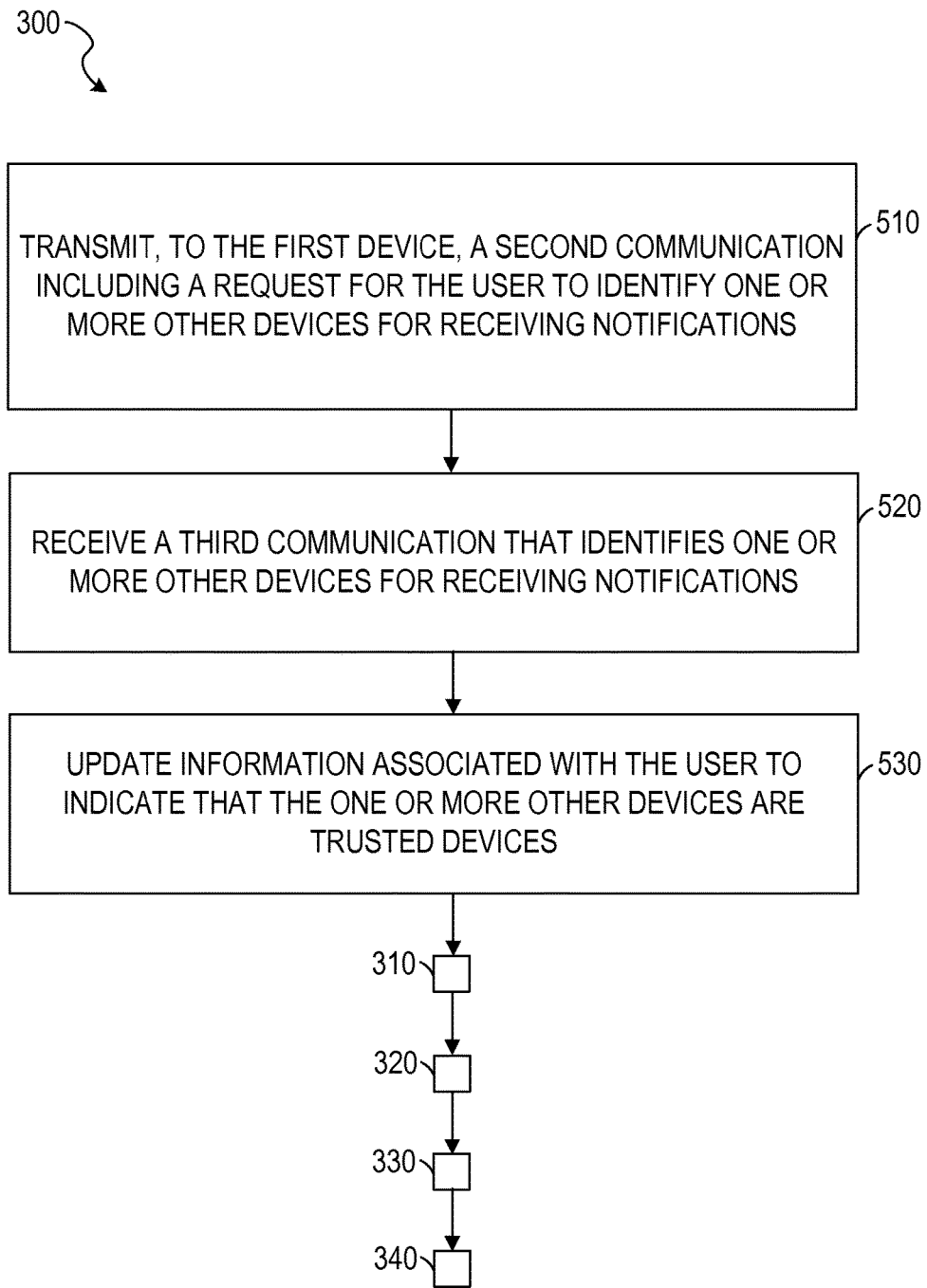
FIG. 5 is a flow diagram illustrating a method for redirecting to a trusted device for secured data transmission, and representing additional steps of the method illustrated in FIG. 3, according to some example embodiments.

As shown in FIG. 5, method 300 includes operations 510, 520, and 530, according to some embodiments. Operation 510 is performed before operation 310, in which the status module 210 determines that a payment page for a purchase of a product or service is being displayed in a user interface of a first device.

In some instances, the communication transmitted by the communication module 230 to the first device is a first communication. At operation 510, the communication module 230 transmits a second communication to the first device. The second communication includes a request for the user to identify one or more other devices for receiving notifications.

Operation 520 is performed after operation 510. At operation 520, the communication module 230 receives a third communication from the first device. The third communication identifies one or more other devices for receiving notifications. The third communication is received in response to the second communication.

Operation 530 is performed after operation 520. At operation 530, the record updating module 250 updates the information associated with the user to indicate that the one or more other devices are trusted devices (e.g., devices trusted for payment).

Figure 6:
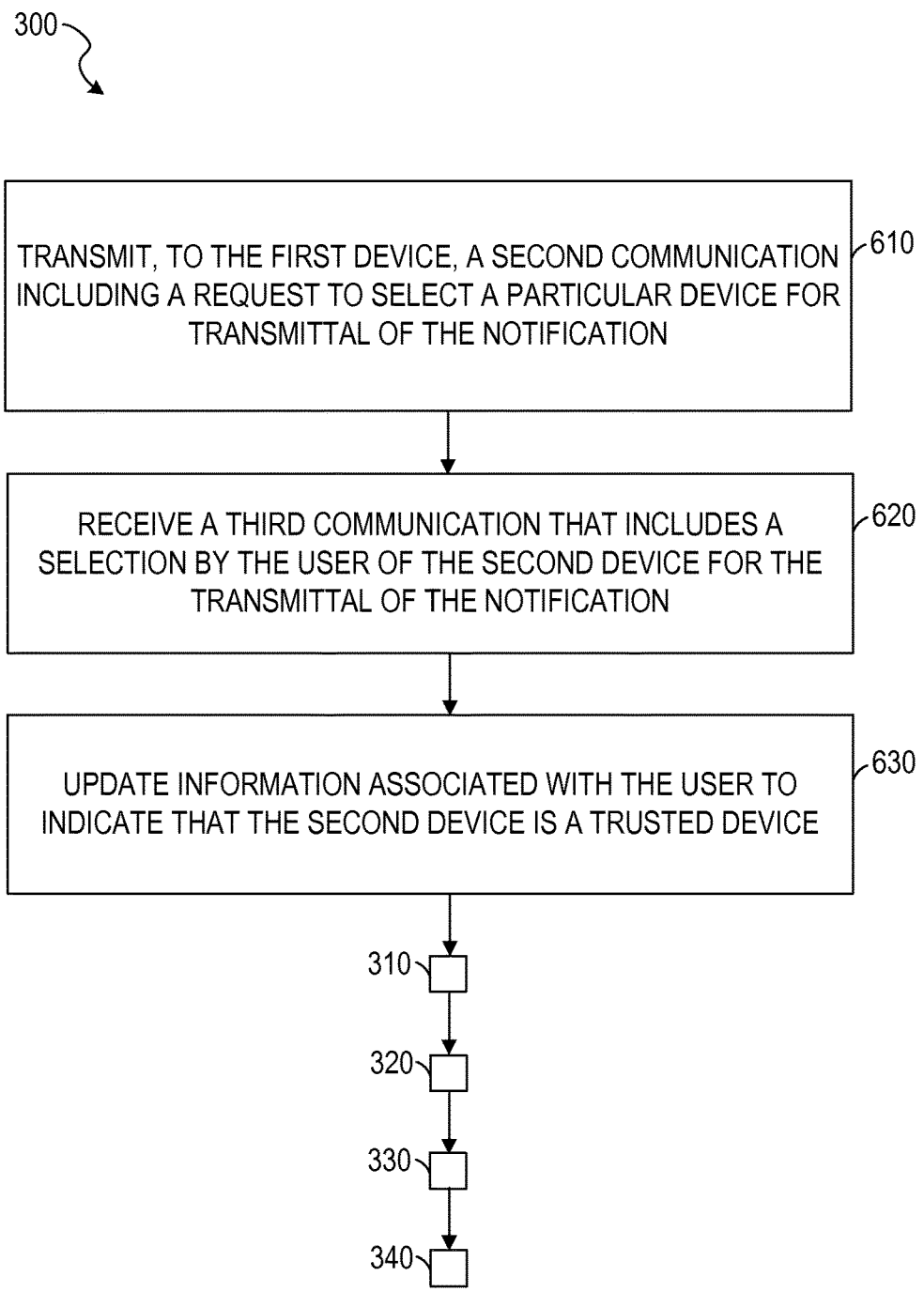
FIG. 6 is a flow diagram illustrating a method for redirecting to a trusted device for secured data transmission, and representing additional steps of the method illustrated in FIG. 3, according to some example embodiments.

As shown in FIG. 6, method 300 includes operations 610, 620, and 630, according to some embodiments. Operation 610 is performed before method operation 310, in which the status module 210 determines that a payment page for a purchase of a product or service is being displayed in a user interface of a first device.

In some instances, the communication transmitted by the communication module 230 to the first device is a first communication. At operation 610, the communication module 230 transmits a second communication to the first device. The second communication includes a request for the user to select, from one or more devices associated with the user, a particular device for transmittal of the notification.

Operation 620 is performed after operation 610. At operation 620, the communication module 230 receives a third communication that includes a selection by the user of the second device for the transmittal of the notification.

Operation 630 is performed after operation 620. At operation 630, the record updating module 250 updates the information associated with the user to indicate that the second device is a trusted device.

Figure 7:
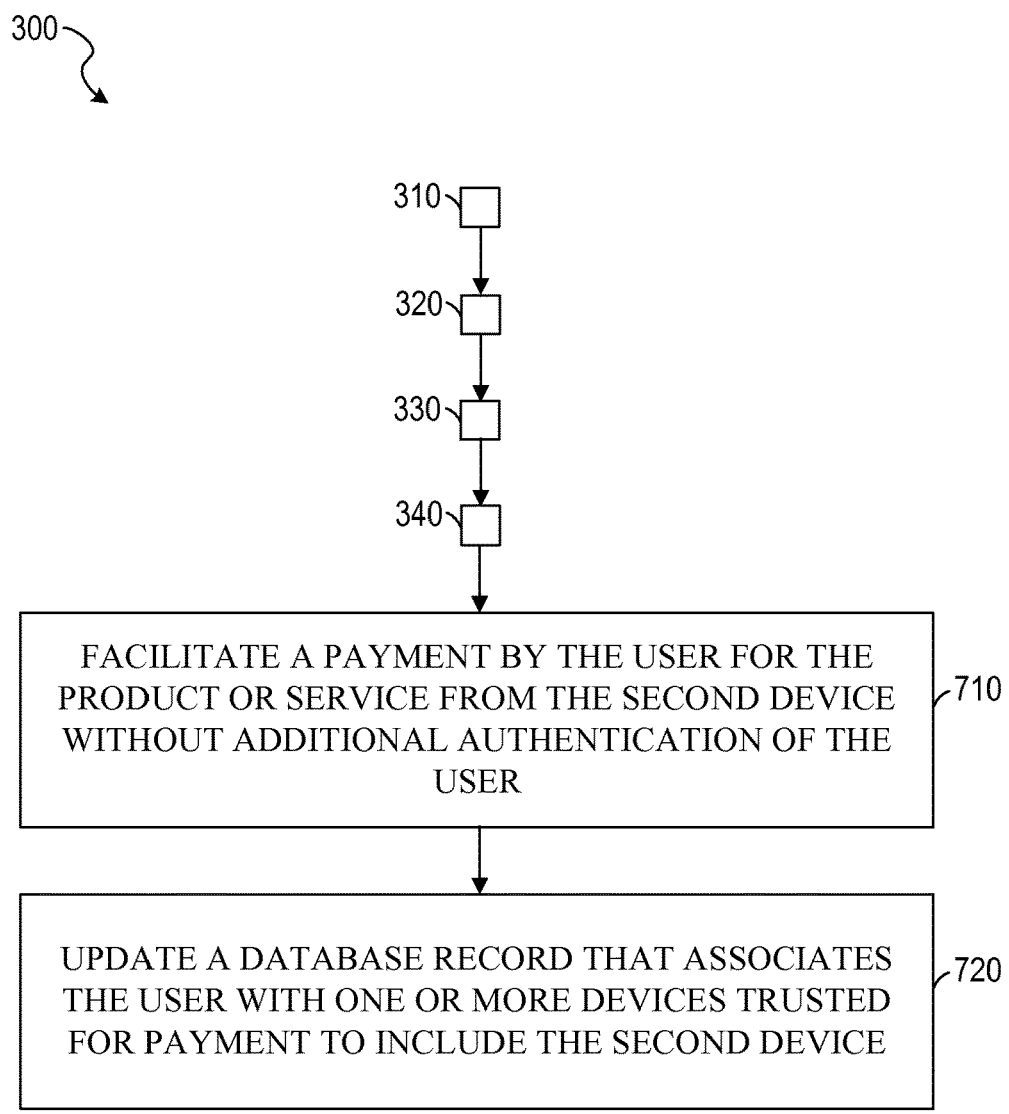
FIG. 7 is a flow diagram illustrating a method for redirecting to a trusted device for secured data transmission and representing additional steps of the method illustrated in FIG. 3, according to some example embodiments.

As shown in FIG. 7, method 300 may include operations 710 and 720, according to some embodiments. Operation 710 is performed after operation 340, in which the communication module 230 transmits a communication including a notification to the second device.

At operation 710, the transaction module 260 facilitates a payment by the user for the product or service from the second device without additional authentication of the user.

Operation 720 is performed after method operation 710. At operation 720, the record updating module 250 updates a database record that associates the user with one or more devices trusted for payment to include the second device.

Example Mobile Device

Figure 8:
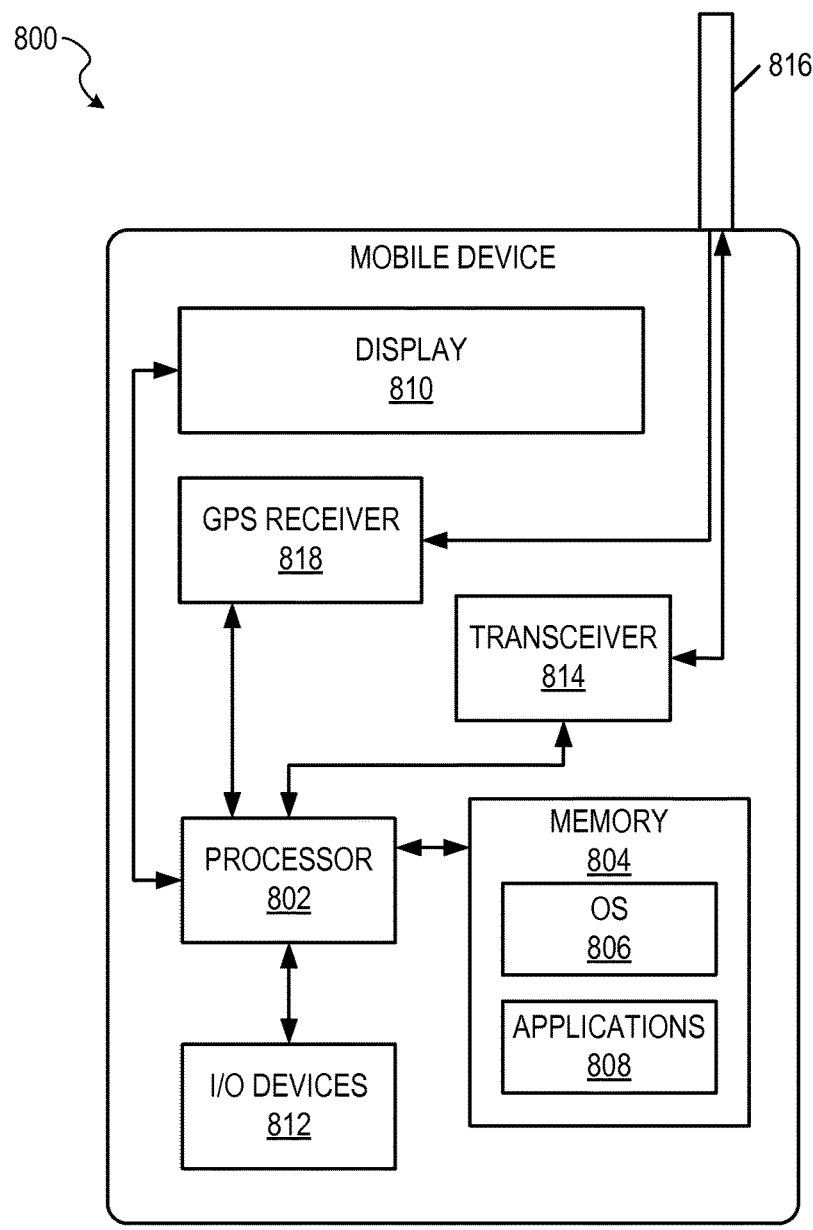
FIG. 8 is a block diagram illustrating a mobile device, according to some example embodiments.

FIG. 8 is a block diagram illustrating a mobile device 800, according to an example embodiment. The mobile device 800 may include a processor 802. The processor 802 may be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or other type of memory, is typically accessible to the processor 802. The memory 804 may be adapted to store an operating system (OS) 806, as well as application programs 808, such as a mobile location enabled application that may provide LBSs to a user. The processor 802 may be coupled, either directly or via appropriate intermediary hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

Figure 9:
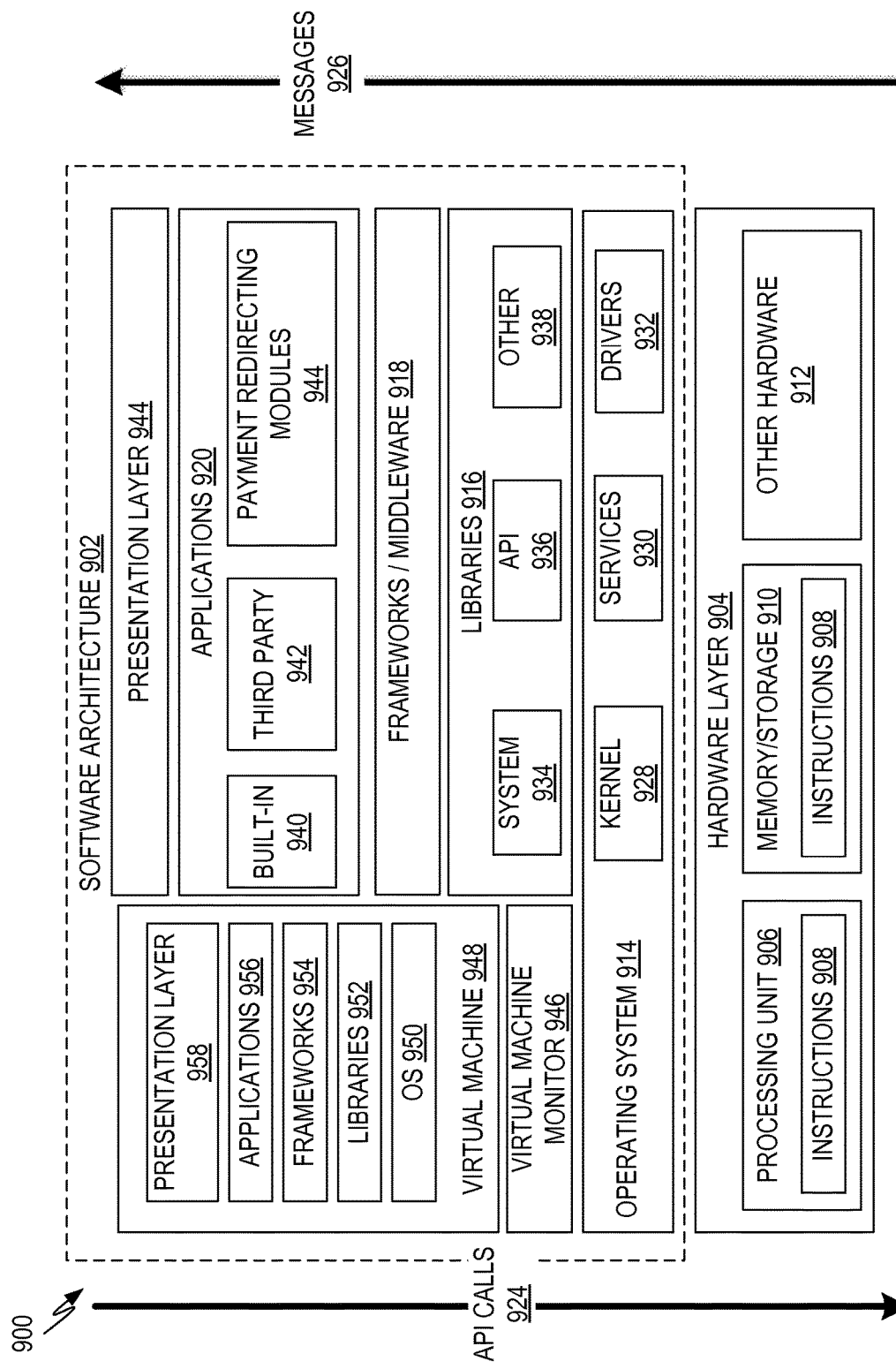
FIG. 9 is a block diagram illustrating an example of a software architecture that may be installed on a machine, according to some example embodiments.
Figure 10:
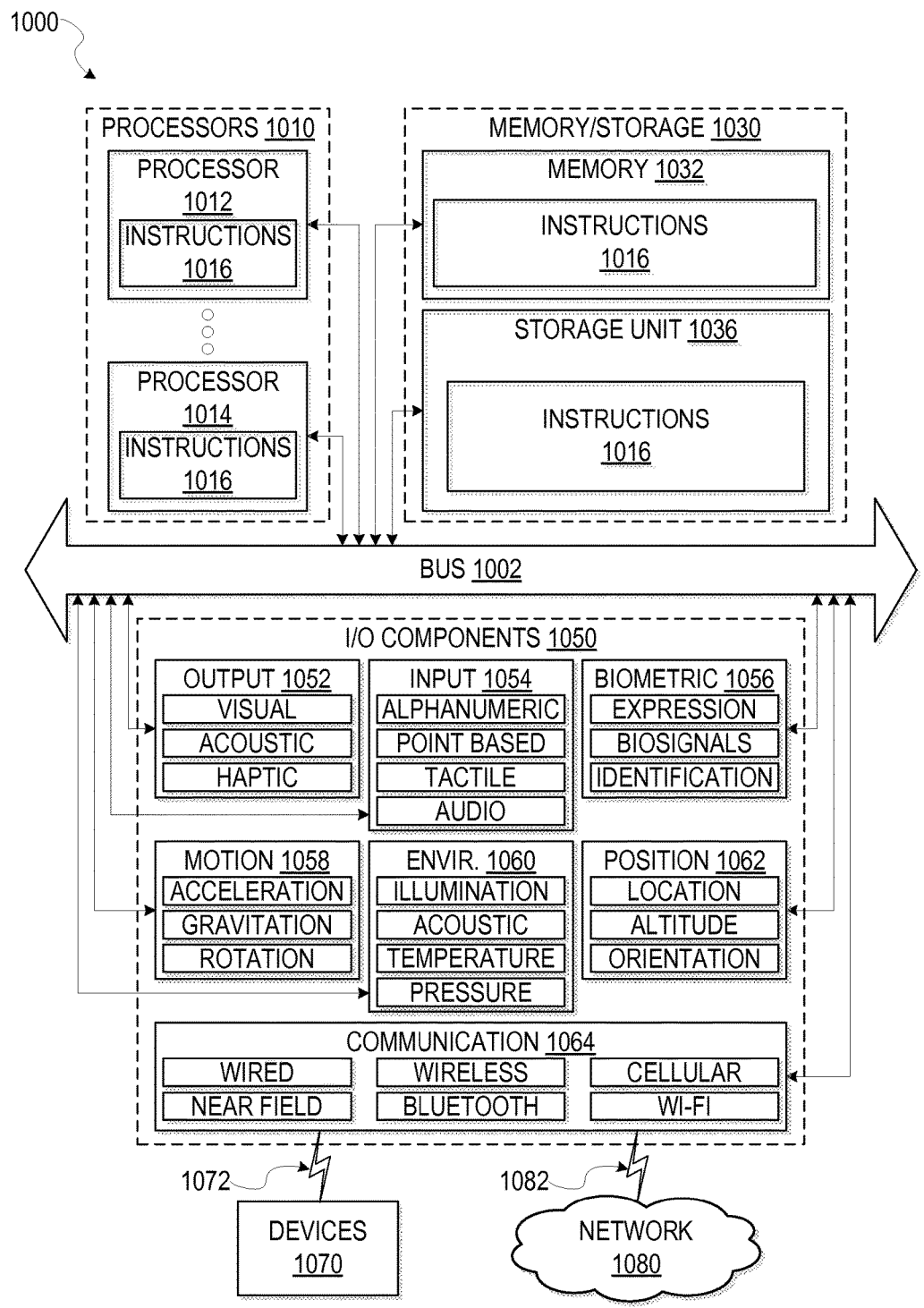
FIG. 10 illustrates a diagrammatic representation of a machine in the form of a computer system within which a set of instructions may be executed for causing the machine to perform any one or more of the methodologies discussed herein, according to an example embodiment.

The modules, methods, applications and so forth described in conjunction with FIGS. 9-10 are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

FIG. 9 is a block diagram 900 illustrating a representative software architecture 902, which may be used in conjunction with various hardware architectures herein described. FIG. 9 is merely a non-limiting example of a software architecture and it will be appreciated that many other architectures may be implemented to facilitate the functionality described herein. The software architecture 902 may be executing on hardware such as machine 1000 of FIG. 10 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. Executable instructions 908 represent the executable instructions of the software architecture 902, including implementation of the methods, modules and so forth of FIGS. 2-7. Hardware layer 904 also includes memory and/or storage modules 910, which also have executable instructions 908. Hardware layer 904 may also comprise other hardware as indicated by 912 which represents any other hardware of the hardware layer 904, such as the other hardware illustrated as part of machine 1000.

In the example architecture of FIG. 9, the software 902 may be conceptualized as a stack of layers where each layer provides particular functionality. For example, the software 902 may include layers such as an operating system 914, libraries 916, frameworks/middleware 918, applications 920 and presentation layer 922. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature, and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940, third party applications 942, and payment redirecting modules 944 (e.g., payment status module 210, device identifying module 220, communication module 230, mapping module 240, record updating module 250, or transaction module 260). Examples of representative built-in applications 940 may include, but are not limited to, a contacts application, a browser application, a book reader application, a location application, a media application, a messaging application, and/or a game application. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware machine (such as the machine of FIG. 10, for example). A virtual machine is hosted by a host operating system (operating system 914 in FIG. 10) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

Example Machine Architecture and Machine-Readable Medium

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions may cause the machine to execute the flow diagrams of FIGS. 3-7. Additionally, or alternatively, the instructions may implement the payment status module 210, the device identifying module 220, the communication module 230, the mapping module 240, the record updating module 250, and the transaction module 260 of FIG. 2. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more hardware processors; and
a machine-readable medium for storing instructions that, when executed by the one or more hardware processors, cause the one or more hardware processors to perform operations comprising:
determining that a page involving a transaction is being displayed in a first user interface of a first device;
automatically detecting a navigation away from the page in the first user interface of the first device;
automatically identifying, based on a database record, a second device that is trusted by the user;
transmitting a communication including a notification to the second trusted device, the notification indicating the transaction; and
causing display of the notification indicating the transaction in a second user interface of the second trusted device.

2. The system of claim 1, wherein the page involving the transaction is a payment page for a purchase of a product or service.

3. The system of claim 1, wherein the communication is a first communication, and wherein the operations further comprise:
receiving a second communication from the first device, the second communication including login data that identifies the user and device data that identifies the first device; and
associating the first device with the user based on the login data and the device data.

4. The system of claim 1, wherein the communication is a first communication, and wherein the operations further comprise:
transmitting a second communication to the first device, the second communication including a request for the user to identify one or more other devices for receiving notifications;
receiving a third communication from the first device, the third communication identifying one or more other devices for receiving notifications; and
updating information associated with the user to indicate that the one or more other devices are trusted devices.

5. The system of claim 1, wherein the communication is a first communication, and wherein the operations further comprise:
transmitting a second communication to the first device, the second communication including a request for the user to select, from one or more devices associated with the user, a particular device for transmittal of the notification;
receiving a third communication that includes a selection by the user of the second device for the transmittal of the notification; and
updating information associated with the user to indicate that the second device is a trusted device.

6. The system of claim 1, wherein the causing of display of the notification indicating the transaction in the second user interface of the second client device includes:
causing display of the notification in a user interface of a smart watch associated with the user.

7. The system of claim 1, wherein the operations further comprise:
facilitating a payment by the user for the product or service from the second device without additional authentication of the user.

8. The system of claim 7, wherein the operations further comprise:
updating a database record that associates the user with one or more devices trusted for payment to include the second device.

9. The system of claim 1, wherein the second device has been previously used by the user to make a payment for a previous purchase.

10. The system of claim 1, wherein the automatic identifying of the second device that is trusted by the user includes:
accessing profile data provided by the user, the profile data including identifiers of one or more devices trusted for payment; and
selecting, based on a device selection rule, the second device for transmittal of the communication including the notification.

11. The system of claim 1, wherein the page involving the transaction is being displayed in the user interface of the first device based on a selection by the user of a representation of a product or service.

12. A method comprising:
determining, using one or more hardware processors, that a page involving a transaction is being displayed in a first user interface of a first device;
automatically detecting a navigation away from the page in the first user interface of the first device;
automatically identifying, based on a database record, a second device that is trusted by the user;
transmitting a communication including a notification to the second trusted device, the notification indicating the transaction; and
causing display of the notification indicating the transaction in a second user interface of the second trusted device.

13. The method of claim 12, wherein the page involving the transaction is a payment page for a purchase of a product or service.

14. The method of claim 12, wherein the communication is a first communication, the method further comprising:
receiving a second communication from the first device, the second communication including login data that identifies the user, and device data that identifies the first device; and
associating the first device with the user based on the login data and the device data.

15. The method of claim 12, wherein the communication is a first communication, the method further comprising:
transmitting a second communication to the first device, the second communication including a request for the user to identify one or more other devices for receiving notifications;
receiving a third communication from the first device, the third communication identifying one or more other devices for receiving notifications; and updating information associated with the user to indicate that the one or more other devices are trusted devices.

16. The method of claim 12, wherein the communication is a first communication, the method further comprising:
transmitting a second communication to the first device, the second communication including a request for the user to select, from one or more devices associated with the user, a particular device for transmittal of the notification;
receiving a third communication that includes a selection by the user of the second device for the transmittal of the notification; and
updating information associated with the user to indicate that the second device is a trusted device.

17. The method of claim 12, wherein the causing of display of the notification indicating the transaction in the second user interface of the second client device includes:
causing a display of the notification in a user interface of a smart watch associated with the user.

18. The method of claim 12, further comprising:
facilitating a payment by the user for the product or service from the second device without additional authentication of the user.

19. The method of claim 12, wherein the second device has been previously used by the user to make a payment for a previous purchase.

20. A non-transitory machine-readable medium comprising instructions that, when executed by one or more hardware processors of a machine, cause the machine to perform operations comprising:
determining that a page involving a transaction is being displayed in a first user interface of a first device;
automatically detecting a navigation away from the page in the first user interface of the first device
automatically identifying, based on a database record, a second device that is trusted by the user;
transmitting a communication including a notification to the second trusted device, the notification indicating the transaction; and
causing display of the notification indicating the transaction in a second user interface of the second trusted device.

* * * * *